United States Patent [19]

Pothetes

[11] Patent Number: 4,739,914

[45] Date of Patent: Apr. 26, 1988

[54] HOLDER FOR SUPPORTING A FISHING ROD ON THE BODY OF A PERSON

[76] Inventor: Nicholas L. Pothetes, 1526 S.E. Knight St., Portland, Oreg. 97202

[21] Appl. No.: 17,179

[22] Filed: Feb. 20, 1987

[51] Int. Cl.⁴ ................................................ A45F 5/00
[52] U.S. Cl. .................... 224/253; 224/247; 224/922
[58] Field of Search ............... 224/200, 208, 247, 252, 224/253, 248, 922, 197, 904, 270; 211/70.8; 43/25, 21.2

[56] References Cited

U.S. PATENT DOCUMENTS

| | | | |
|---|---|---|---|
| 1,786,254 | 12/1930 | Meehan . | |
| 2,537,456 | 1/1951 | Goss . | |
| 2,846,129 | 8/1958 | O'Brien | 224/922 X |
| 2,954,909 | 10/1960 | Miller et al. | 224/922 X |
| 3,282,482 | 11/1966 | Scharsu . | |
| 3,874,573 | 4/1975 | Fruscella . | |
| 3,885,721 | 5/1975 | Vanus . | |
| 4,569,466 | 2/1986 | Webber . | |

Primary Examiner—Henry J. Recla
Assistant Examiner—David Voorhees
Attorney, Agent, or Firm—Eugene M. Eckelman

[57] ABSTRACT

A U-shaped base member has vertical belt receiving slots arranged to support this member on the belt of a person. A jaw assembly is supported on the base member. The jaw assembly has jaws which cooperate to detachably support a fishing rod in the holder. The U-shaped base member is arranged to hold the fishing rod in spaced relation from the fisherman's body. The jaw assembly is supported on the base member by a pivot post, and associated with the pivot post are positioning recesses to provide a plurality of angular adjusted positions of the pole.

3 Claims, 1 Drawing Sheet

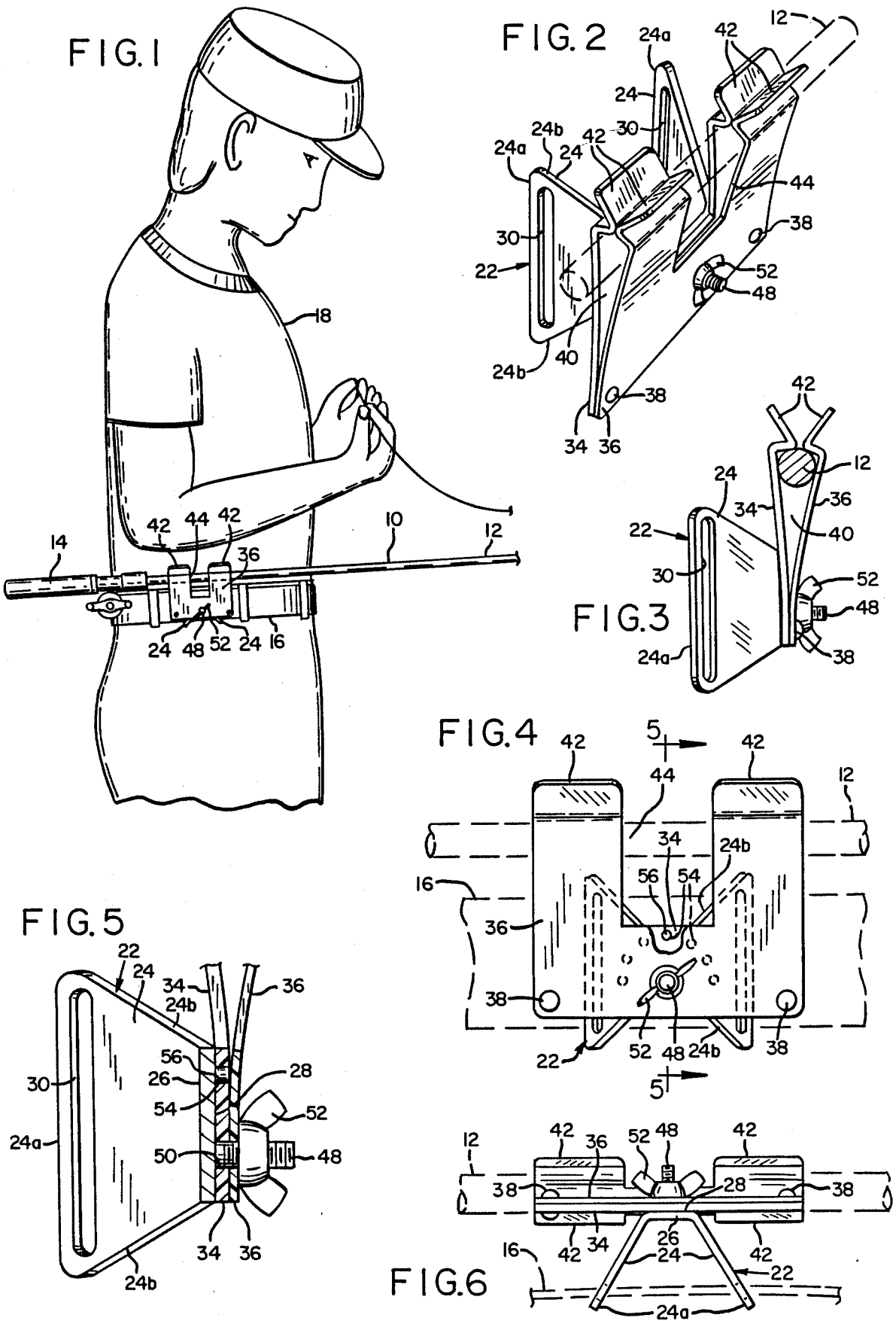

4,739,914

HOLDER FOR SUPPORTING A FISHING ROD ON THE BODY OF A PERSON

BACKGROUND OF THE INVENTION

This invention relates to new and useful improvements in holders for supporting a fishing rod on the body of a person.

Holders have heretofore been provided for supporting a fishing rod on the body of a person so that the fisherman is able to tie the line, bait the hook, etc. and use both hands. As an example, U.S. Pat. No. 3,874,573 provides a belt supported holster in which the handle end of the fishing rod is removably mounted, thus holding the fishing rod temporarily on the body. U.S. Pat. No. 2,346,129 shows a fishing rod holder utilizing a spring bail member into which the fishing rod handle can be removably attached. Other types of holders are also shown in U.S. Pat. Nos. 2,537,456 and 3,282,482.

Such devices, although serving an intended purpose, have certain disadvantages. One such disadvantage is that the belt mounted holders hold the fishing rod close to the hip and thus do not provide for clearance of heavy clothes and the like. Also, prior devices do not provide for angular adjustment of the fishing rod whereby the rod when in the holder cannot be selectively positioned for performing the various functions with both hands and for obtaining desired angle on the rod.

SUMMARY OF THE INVENTION

According to the present invention and forming a primary objective thereof, a holder is provided for supporting a fishing rod on the body of a person such that the rod is arranged to be held in spaced relation from the hip of the person so as to provide convenience in attachment and detachment and for clearing clothes worn by the person.

Another important object of the invention is to provide a holder of the type described which is adjustable on a horizontal axis so that the rod can be positioned in a plurality of angular adjustments in an upright plane.

Further objects of the invention are to provide a holder of the type described which has structural parts that are inexpensively stamped from suitable materials and which has novel jaw means providing easy attachment and detachment of a fishing rod. In carrying out the objectives of the invention, the invention employs a U-shaped base member the legs of which have belt slots therein and the connecting wall of which supports a first jaw member thereon. A second jaw member is associated with the first jaw member and is semi-flexible so as to allow a fishing rod to be installed in and removed from between the jaws. The jaw assembly has pivotal set positions on a horizontal axis so that a fishing rod installed therein can be adjusted to various angles in an upright plane. The ends of the legs of the base member abut against the person and have a length which holds the jaw assembly in spaced relation from the hips of the person.

The invention will be better understood and additional objects and advantages will become apparent from the following description taken in connection with the accompanying drawings.

BRIEF DESCRIPTION OF THE DRAWINGS

FIG. 1 is an elevational view of the present holder as supported on a person for holding a fishing rod in a position such that the hands of the person are free;

FIG. 2 is a perspective view of the fishing rod holder;

FIG. 3 is an end elevational view of the holder;

FIG. 4 is an enlarged outer surface elevational view of the holder showing details of structure;

FIG. 5 is a cross sectional view taken on the line 5—5 of FIG. 4; and

FIG. 6 is a bottom plan view of the holder.

DETAILED DESCRIPTION OF A PREFERRED EMBODIMENT

FIG. 1 illustrates the general concept of the invention wherein a fishing rod 10 having a shank portion 12 and a handle portion 14 is temporarily supported on the belt 16 of a person 18.

Also, with reference to the other views as well, the present rod holder includes a generally U-shaped body member or base 22 having diverging legs 24 and a connecting wall 26 with a flat outer or end surface 28. The legs 24 have elongated slots 30 therein adjacent the edges 24a, which are opposite from the connecting wall 26 and with the belt of the person extending through these slots, it is apparent that the surface 28 of end wall 26 will face outwardly and be in a substantially vertical position as well as in a position which is spaced considerably outwardly from the hip of the person. In such position, the opposed end edges 24b of the body member extend in an outward direction, FIG. 2.

Supported on the surface 28 of the base member is a jaw assembly comprising a sturdy substantially rigid inner or first jaw 34 which supports a semi-flexible outer or second jaw 36 thereon. The outer jaw 36 preferably is secured to the inner jaw 34 in integral relation, such as by rivets 38 or other means, or this jaw assembly could be formed of one piece if desired. These two jaws are shaped to provide a longitudinal socket 40 therebetween, FIGS. 2 and 3, and have flared mouth portions 42 which allow the rod to be readily installed and removed frictionally. The jaws are sufficiently elongated to allow a good elongated grip on the fishing rod. A front opening central and lateral notch 44 is provided in the jaws to allow the fisherman to grasp the rod as it is inserted or removed from the jaws. The flared portions 42 of the jaws and the notch 44 face upwardly when the holder is mounted in place on the belt.

Securement of the jaw assembly to the surface 28 of the body member 22 is by a pivot post 48 integral with the body member and extending outwardly from the surface 28. This post extends freely through an aperture 50 in the jaw assembly which is disposed rearward of the pole receiving socket 40. The outer end of the pivot post 48 is threaded and projects beyond the jaw assembly for receiving a wing nut 52 or other fastener element which allows the jaw assembly to be clamped securely in place or to be loosened and adjusted at any angle desired around the axis of post 48. Set positions are provided between the base member and the jaw assembly, and for this purpose the surface of inner jaw 34 which is disposed adjacent to wall 26 is provided with a series of holes or recesses 54 in an arcuate pattern and the upper surface 28 of the base member has a projection 56 arranged for selective engagement with the holes 54. Thus, by loosening and tightening the wing nut 52, positive rotatably adjusted positions of the jaw assembly can be accomplished.

According to the present invention, the device is readily installed on the person by inserting the trouser belt through the belt slots 30. In such position, the flared portions 42 of the jaw assembly face upwardly and a fisherman can readily push the rod downwardly into the socket 40. By suitable adjustment on the pivot post 48, the rod can be angled as desired which is important to allow the fisherman to properly handle the line with both hands, and also such adjustable positioning can allow the fisherman to support the rod on his body without the use of hands while the pole is in fishing position. With the U-shaped construction of the base member 22, the rod holding portion of the device is spaced outwardly from the hip of the person and this allows clearance of the rod relative to the body. The construction of the device is such that the socket 40 will hold rods of different sizes, and although it is preferred that the fishing rod be installed with the shaft portion thereof in the socket, such socket could as well receive the handle portion of the rod. The jaw members preferably are stamped from a suitable plastic, such as a polycarbonate, which is rugged and fracture resistant. The inner jaw is constructed of a thickness which makes it substantially rigid while the outer jaw is of less thickness to possess the required flexibility which allows the rod to be inserted and at the same time which holds the rod fixedly in place.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A holder for supporting a fishing rod on the body of a person comprising:

a U-shaped base member having inner and outer defining portions and having vertical belt receiving slots between said inner and outer defining portions arranged to hold the base member on the body of a person with said outer defining portions spaced from the person's body and in a vertical plane, said U-shaped base member comprising a pair of diverging legs having free ends thereof forming said inner defining portion, said free ends of said legs abutting against the person's body when the holder is supported on the belt to provide said spacing of said outer defining portion outwardly from the body, said outer defining portion of said base member comprising a connecting wall for said legs supporting a first jaw member, said first jaw member pivotally supported on said connecting wall with the axis of the pivot support of said first jaw member extending at right angles to said connecting wall whereby said jaw member is pivotally adjustable relative to said connecting wall which in turn comprises adjustment in a vertical plane to vary the upright angle of a fishing pole in the holder, and a second jaw member supported on said first jaw member and arranged relatively thereto to cooperatively and attachably support a fishing rod therebetween to free both hands of the person.

2. The holder of claim 1 wherein said belt receiving apertures are provided in said legs adjacent the free ends of the latter.

3. The holder of claim 1 wherein said jaw members are constructed of plate-like material with opposite ends; and have a leteral notch leading into said jaw members between said ends which allows the person to grip a fishing rod when moving it into or out of the jaws.

* * * * *